No. 775,084. PATENTED NOV. 15, 1904.
C. P. LANG.
WRENCH.
APPLICATION FILED APR. 14, 1904.
NO MODEL.
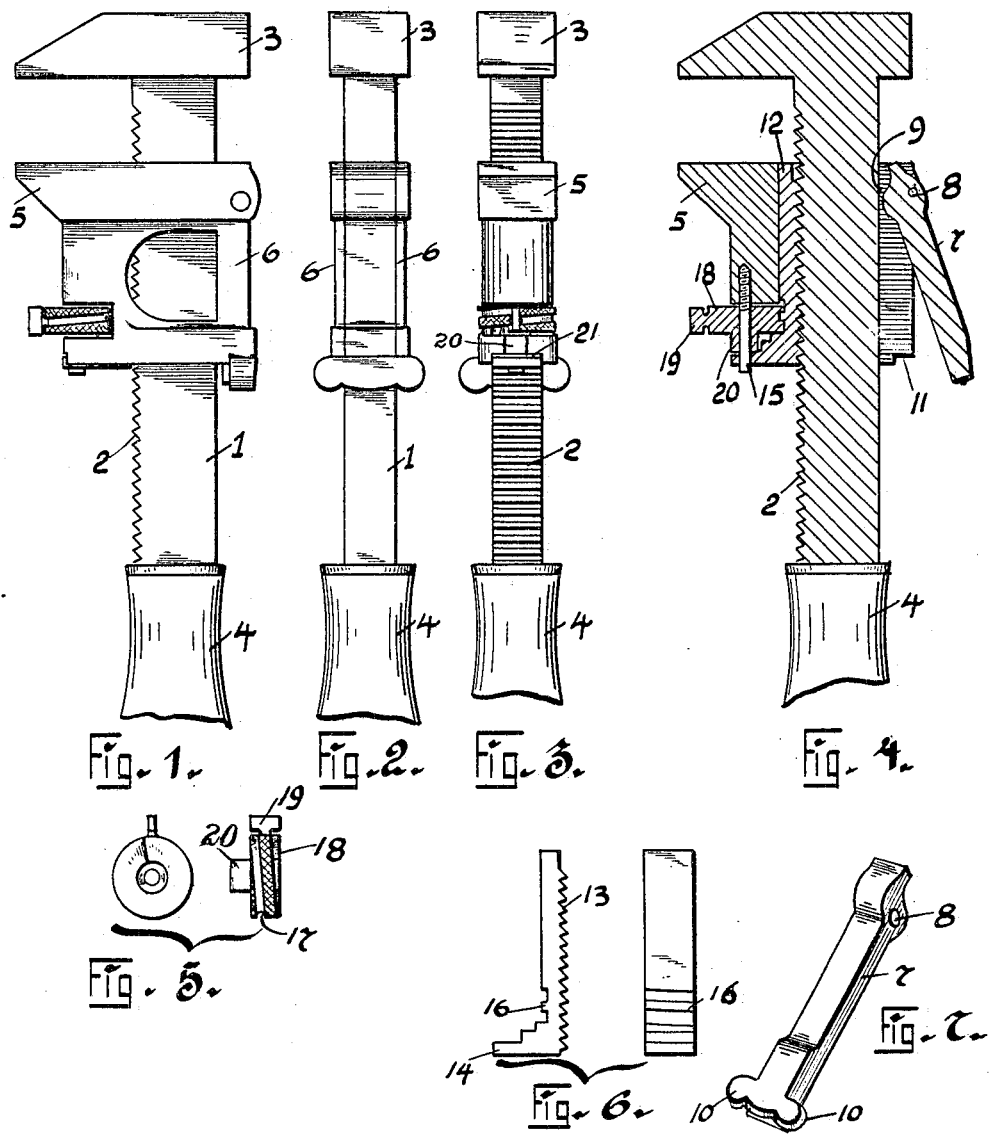

No. 775,084. Patented November 15, 1904.

UNITED STATES PATENT OFFICE.

CHARLES P. LANG, OF DUQUESNE, PENNSYLVANIA.

WRENCH.

SPECIFICATION forming part of Letters Patent No. 775,084, dated November 15, 1904.

Application filed April 14, 1904. Serial No. 203,090. (No model.)

*To all whom it may concern:*

Be it known that I, CHARLES P. LANG, a citizen of the United States of America, residing at Duquesne, in the county of Allegheny and State of Pennsylvania, have invented certain new and useful Improvements in Wrenches, of which the following is a specification, reference being had therein to the accompanying drawings.

This invention has relation to wrenches of that class wherein a shank having a fixed jaw is provided with a sliding jaw and the sliding jaw is furnished with means for locking it at any position to which it may be adjusted upon the shank, such wrenches being commonly known as "monkey-wrenches;" and my invention has for its object the provision of novel means for locking the sliding jaw upon the shank in roughly-adjusted position and for securing a finer adjustment of the sliding jaw than can be attained by means of the rack on the shank and a member on the sliding jaw engaging with said rack.

In order to have the rack on the shank of the monkey-wrench of sufficient strength, it is necessary that the teeth on the rack should be comparatively large, and hence a fine adjustment or an adjustment within limits of less than the distance between two teeth is impossible. By my improvement I provide for the adjustment of the sliding jaw to approximately the point at which it is desired to fix the same, and I also provide for a minute adjustment of the sliding jaw, as will be hereinafter described.

My invention consists in the novel construction, combination, and arrangement of parts hereinafter described and claimed.

I have illustrated my improvement in the accompanying drawings, wherein—

Figure 1 is a side elevation of a wrench, showing the same. Fig. 2 is a rear view, and Fig. 3 a front view, of the wrench shown in Fig. 1. Fig. 4 is a vertical transverse sectional view of the same. Fig. 5 shows in plan and edge view one of the parts. Fig. 6 shows in plan and edge view another of the parts, and Fig. 7 shows in perspective still another of the parts of my improved wrench.

The shank 1 of the wrench is formed with a row of teeth 2 on one edge and with a fixed jaw 3 and handle 4. The shank 1 carries a sliding jaw 5, the sliding jaw being formed with rearwardly-projecting plates 6 6, between which is arranged a swinging lever 7, that is pivotally attached to the plates 6 6 near the top thereof by a pivot 8. When the lever is pressed in against the shank, it bears against the back of the same. The lower end of the lever 7 is formed with ears 10 10, by means of which the lever can be manipulated, these ears resting when the lever is pressed in against the shank under the plates 6 6 in notches 11, formed in the lower edge of the plates. The lever 7 has a straight back 9', which merges into a cam 9 at its upper end, which when the lever is pushed in is in contact with the shank. Between the plates 6 6 and adjacent to the teeth 2 on the shank is arranged a movable toothed bar 12, which has teeth 13 on its inner edge that mesh with the teeth 2 on the shank and which is formed with a pierced lug 14 on its lower end, through which passes a screw-pin 15, that screws into the sliding jaw 5. The bar 12 has formed on its outer edge a single inclined tooth 16, which enters a spiral slot 17 in a nut 18, that is loosely mounted on the pin 15, and seats in a slot 18', formed in the sliding jaw, and is provided with a thumb-piece 19, by means of which it can be turned. The nut 18 is formed with a boss on its lower side 20 which when the nut is in position bears upon the lower wall of the slot 18' in the sliding jaw.

The pierced lug 14 of the bar 12 seats in a groove 21 in the sliding member, and the pin 15 passes easily through the hole in said lug, so that the sliding member, the pin, and the nut can be moved relatively to the bar 12, while the latter is engaged by the shank.

In operation the parts are fitted together, as shown in the drawings, and when it is desired to move the sliding jaw up or down the shank the lever 7 is swung outwardly, so as to assume the position shown in Fig. 4. The sliding jaw can then be tilted slightly, in which position the teeth on the bar 12 will be out of engagement with the teeth on the shank, and the sliding jaw can be then moved to the desired position, whereupon the lever 7 is swung inwardly into alinement with the back of the shank and the sliding jaw will be drawn into the position shown in Fig. 4, the lever 7 in that view being drawn out slightly, but the sliding jaw being in the position which it occupies when the lever is pushed in. After the sliding jaw has been secured in position by pressing in the lever 7 to the position shown in Figs. 1 and 2 a minute adjustment of the sliding jaw can be secured by turning the nut 18, which being moved longitudinally by the tooth 16 working in the spiral slot 17 moves the sliding jaw upwardly and downwardly, accordingly as the nut is turned in one direction or the other.

Having described my invention, I claim—

1. In a device of the character described, the combination with a shank having a fixed jaw and a rack on its edge, of a sliding jaw embracing the shank, a lever pivoted to said jaw at the back of the shank, a bar carried by the sliding jaw and having teeth engaging the rack on the shank, and means for moving the sliding jaw when the said bar is in engagement with the shank.

2. In a device of the character described, the combination with a shank having a rack on its edge and a fixed jaw, of a sliding jaw mounted on said shank, a toothed bar carried by said sliding jaw and adapted to engage the teeth on the shank, a lever carried by the sliding jaw and adapted to maintain said bar and shank in engaged position, a tooth carried by said bar, and a nut having a spiral groove engaging said tooth, said nut being mounted in the sliding jaw and adapted to move said jaw in either direction.

3. In a device of the character described, the combination with a shank, a stationary jaw carried by said shank, and a sliding jaw having rearwardly-projecting arms embracing the shank, of a bar mounted in the sliding jaw between said plates and adapted to engage the shank, a lever pivotally mounted between said plates at the back of the shank, said bar having a pierced lug and a tooth on one side, a pin passing through said pierced lug and secured in the sliding jaw, and a nut having a spiral groove in its periphery that receives said tooth, the said nut being mounted in a slot in the sliding jaw and revolving on said pin.

In testimony whereof I affix my signature in the presence of two witnesses.

CHARLES P. LANG.

Witnesses:
H. C. EVERT,
K. H. BUTLEN.